United States Patent [19]
Del Vecchio et al.

[11] Patent Number: 4,842,170
[45] Date of Patent: Jun. 27, 1989

[54] LIQUID METAL ELECTROMAGNETIC FLOW CONTROL DEVICE INCORPORATING A PUMPING ACTION

[75] Inventors: Robert M. Del Vecchio, Turtle Creek; Robert M. Slepian, Pittsburgh, both of Pa.

[73] Assignee: Westinghouse Electric Corp., Pittsburgh, Pa.

[21] Appl. No.: 70,017

[22] Filed: Jul. 6, 1987

[51] Int. Cl.⁴ .............................................. B22D 41/08
[52] U.S. Cl. ...................................... 222/594; 266/237
[58] Field of Search ............... 222/590, 591, 594, 597, 222/606; 266/234, 237; 164/500, 502, 503; 137/13, 807; 310/11; 103/1

[56] References Cited

U.S. PATENT DOCUMENTS

| | | | |
|---|---|---|---|
| 2,558,698 | 6/1951 | Wade | 103/1 |
| 2,743,492 | 5/1956 | Easton | 22/79 |
| 2,756,678 | 7/1956 | Collins | 103/1 |
| 2,929,326 | 3/1960 | Ingels | 103/1 |
| 3,122,663 | 2/1964 | Kach | 310/11 |
| 3,214,614 | 10/1965 | Maeder | 310/11 |
| 3,275,859 | 9/1966 | Meyerand, Jr. et al. | 310/11 |
| 3,463,365 | 8/1969 | Dumont-Fillon | 222/594 |
| 3,486,660 | 12/1969 | Heintz | 222/590 |
| 3,759,635 | 9/1973 | Carter et al. | 417/50 |
| 4,082,207 | 4/1978 | Garnier et al. | 222/594 |
| 4,200,137 | 12/1980 | Zavaras et al. | 164/49 |
| 4,216,800 | 8/1980 | Garnier et al. | 137/807 |
| 4,324,266 | 4/1982 | Garnier et al. | 137/13 |
| 4,458,744 | 7/1984 | Yarwood et al. | 164/503 |
| 4,462,457 | 7/1984 | Kindlmann et al. | 164/503 |
| 4,471,832 | 9/1984 | Yarwood et al. | 164/503 |
| 4,487,401 | 12/1984 | Vives | 266/234 |
| 4,527,616 | 7/1985 | Kaneko | 164/502 |
| 4,601,327 | 7/1986 | Kaneko et al. | 164/502 |
| 4,635,705 | 1/1987 | Kuznetsou | 164/466 |
| 4,635,706 | 1/1987 | Behrens | 164/500 |
| 4,655,237 | 4/1987 | Glook et al. | 137/13 |
| 4,682,645 | 3/1987 | Kindlmann et al. | 164/453 |

FOREIGN PATENT DOCUMENTS

| | | |
|---|---|---|
| 0021889 | 1/1981 | European Pat. Off. . |
| 0043987 | 9/1982 | European Pat. Off. . |
| 0079580 | 12/1982 | European Pat. Off. . |
| 0093068 | 9/1983 | European Pat. Off. . |
| 0155575 | 6/1986 | European Pat. Off. . |
| 1803473 | 10/1968 | Fed. Rep. of Germany . |
| 2629045 | 6/1976 | Fed. Rep. of Germany . |
| 2903234 | 6/1979 | Fed. Rep. of Germany . |
| 1281403 | 2/1962 | France . |
| 45-36677 | 11/1970 | Japan . |
| 53-12120 | 10/1978 | Japan . |
| 0381475 | 8/1973 | U.S.S.R. . |
| 0427234 | 6/1974 | U.S.S.R. ............................... 311/222 |
| 0430282 | 12/1974 | U.S.S.R. ............................... 311/222 |
| 0493296 | 2/1976 | U.S.S.R. . |
| 0723743 | 10/1980 | U.S.S.R. . |

OTHER PUBLICATIONS

Publication: "Electromagnetic Devices For Molten Metal Confinement" by M. Garnier; vol. 24, Progress in Astronautics and Aeronautics, Inc., NY 12/1983), pp. 433–441.

Primary Examiner—S. Kastler

[57] ABSTRACT

A liquid metal electromagnetic flow control device for controlling liquid metal flow through a nozzle orifice includes an alternating current electromagnetic coil disposed adjacent the nozzle and surrounding the orifice therein, and a nonconductive structure disposed along a portion of the coil and occupying an axial portion of the nozzle orifice and leaving an adjacent portion of the nozzle orifice unoccupied. The coil is operable to produce a magnetic field being axially directed and eddy currents being azimuthally directed within the nozzle orifice and the liquid metal flowing therethrough. The structure defines eddy current flow regions and eddy current nonflow regions through the occupied portion of the orifice. The eddy current nonflow regions are positioned relative to said eddy current flow regions thereof so as to substantially block production of eddy currents in the liquid metal as the metal flows through the eddy current nonflow regions. Such blockage reshapes the magnetic field within the orifice at a region of transition therewithin between the eddy current flow and nonflow portions of the orifice to have a radially directed component which produces a substantially axially directed electromagnetic pumping force in the nozzle which controls the flow of liquid metal therethrough be either impeding or assisting the liquid metal flow.

15 Claims, 8 Drawing Sheets

LIQUID METAL ELECTROMAGNETIC FLOW CONTROL DEVICE INCORPORATING A PUMPING ACTION

CROSS REFERENCE TO RELATED APPLICATIONS

Reference is hereby made to the following copending applications dealing with related subject matter and assigned to the assignee of the present invention:

1. "Electromagnetic Apparatus for Restraining the Flow of Molten Metal from a Vessel" by Christopher C. Alexion et al, assigned U.S. Ser. No. 698,485 and filed Feb. 5, 1985. (W.E. 51,881)

2. "Improved Discrete Excitation Coil Producing Seal at Continuous Casting Machine Pouring Tube Outlet Nozzle/Mold Inlet Interface" by Dennis Pavlik et al, assigned U.S. Ser. No. 050,272 and filed May 15, 1987. (W.E. 53,617)

BACKGROUND OF THE INVENTION

1. Field of the Invention

The present invention relates generally to the control of liquid metal flow by electromagnetic means and, more particularly, is concerned with an electromagnetic flow control device incorporating a pumping action in controlling liquid metal flow.

2. Description of the Prior Art

Figure 1:
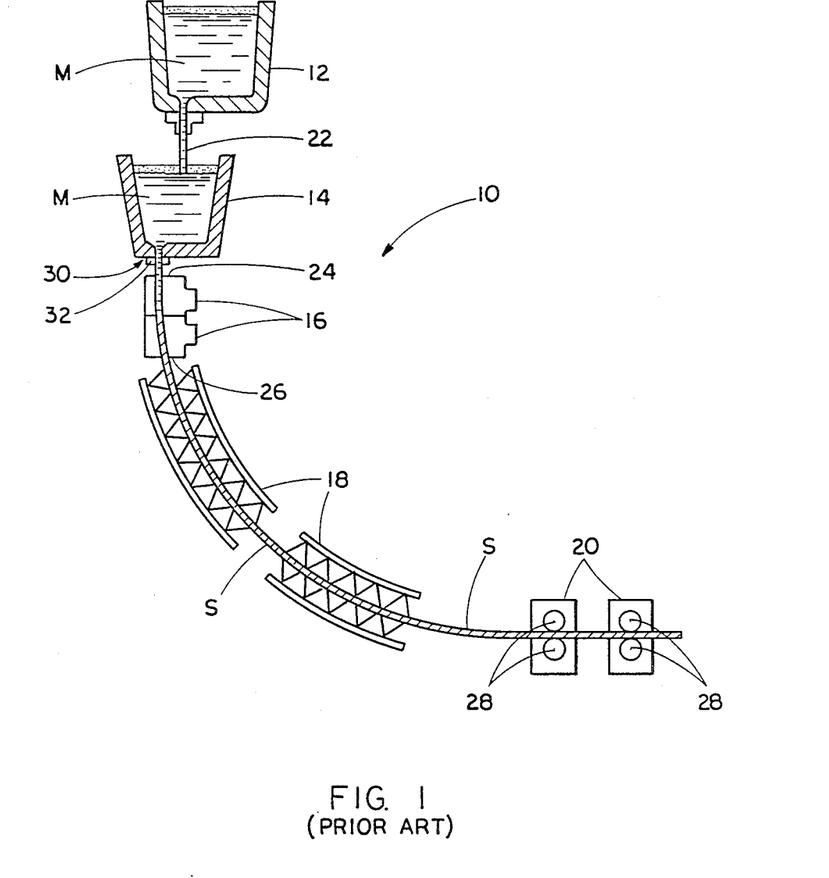
FIG. 1 is a schematic representation of a prior art vertical continuous casting line.

The control of liquid metal flow by electromagnetic means has potentially many important industrial applications. One of these is in the area of vertical continuous casting of steel. FIG. 1 shows schematically a vertical continuous casting line, generally designated by the numeral 10. The continuous casting line 10 includes a ladle 12, a tundish 14, a casting mold 16, a spray zone 18 and a straightener 20 arranged in serial fashion. Hot molten metal M in a stream issues from the ladle 12 through a pouring tube 22 into the tundish 14. The tundish 14, in turn, infeeds the molten metal M contained therein in a free stream to an upper inlet end 24 of the casting mold 16. A continuous solid shell of metal S is formed around a liquid core in the casting mold 16 and withdrawn from a lower outlet end 26 thereof. The continuous shell or strand S is then fed through the spray zone 18 where it is progressively cooled to solidify the liquid core and thereafter the strand is fed between rolls 28 of the straightener 20.

Figure 2:
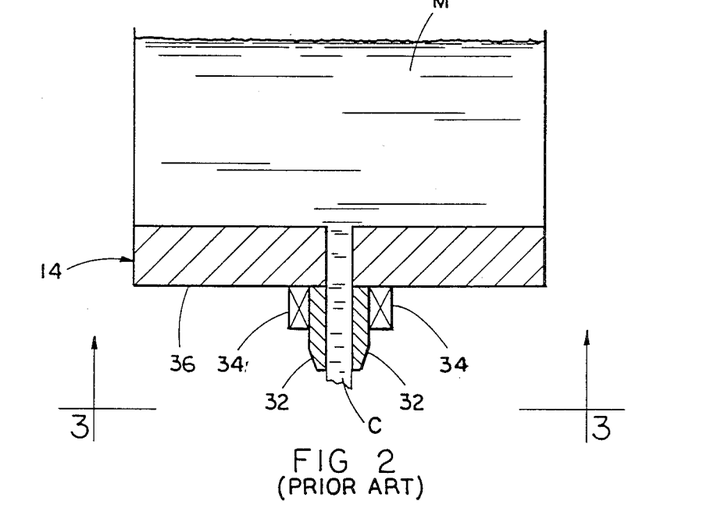
FIG. 2 is a schematic representation of a prior art electromagnetic flow control valve extending from the bottom of a tundish of the continuous casting line of FIG. 1.

In the case of liquid steel alloys, for example, there is a need to control the flow of the liquid metal M into the casting mold 16 in order to produce a uniform product. As schematically depicted in FIG. 2, one proposal is to provide an electromagnetic flow control valve 30 between the tundish 14 and the casting mold 16, preferably at an outlet nozzle 32 of the tundish 14. The valve 30 is needed at that location because the liquid steel level in the tundish 14 varies, creating variations in the pressure head which drives the flow. Also, temperature variations in the melt can adversely affect the quality of the cast product unless compensated for by varying the flow. Since there is little space available in this area, the valve 30 must be compact. It must also withstand the high temperatures involved (about 1500 degrees C. for liquid steel) and possible freezing and remelting of the liquid metal inside of the valve. Because it contains no moving parts and does not require close tolerance fittings, the electromagnetic valve 30 is considered very promising for this application.

Figure 3:
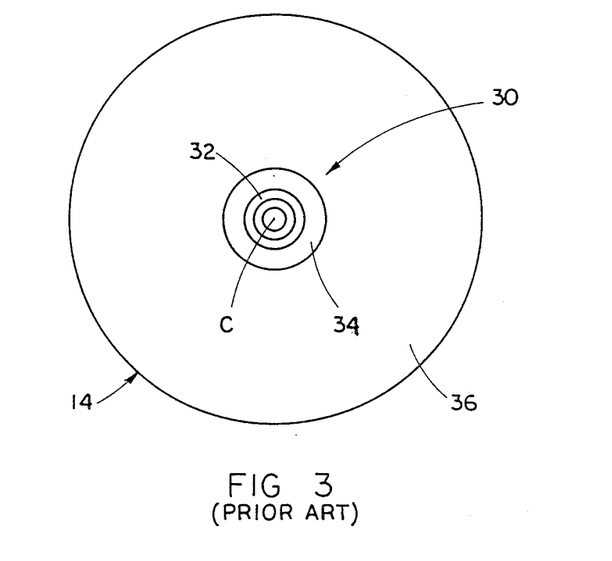
FIG. 3 is a bottom plan view as seen along line 3—3 of FIG. 2.
Figure 4:
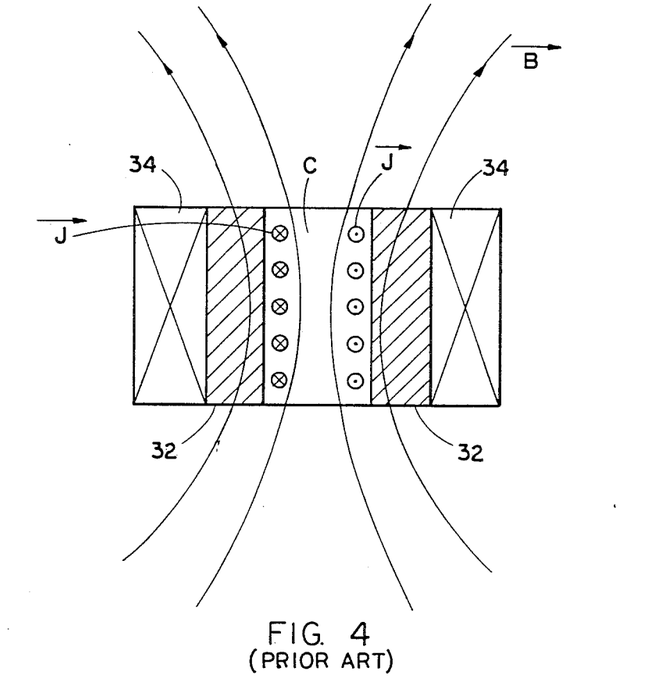
FIG. 4 is an enlarged axial sectional view of the electromagnetic flow control valve of FIG. 2, showing the respective directions of the magnetic field and eddy currents.

The electromagnetic flow control valve 30, shown in schematic form in FIGS. 2-4, includes a single AC coil 34 disposed adjacent to the outlet nozzle 32 of the tundish 14 protruding from the bottom 36 thereof. Several versions of an electromagnetic valve and nozzle arrangement for controlling liquid metal flow rates or throughput are disclosed in U.S. patents to Garnier et al (U.S. Pat. Nos. 4,082,207 and 4,324,266) and also in an article entitled "Electromagnetic Devices For Molten Metal Confinement" by M. Garnier (edited by H. Branover, P. S. Lykoudes, and A. Yakhot, Vol. 24, Progress In Astronautics and Aeronautics, Inc., N.Y. (1983), pp. 433-441).

Figure 5:
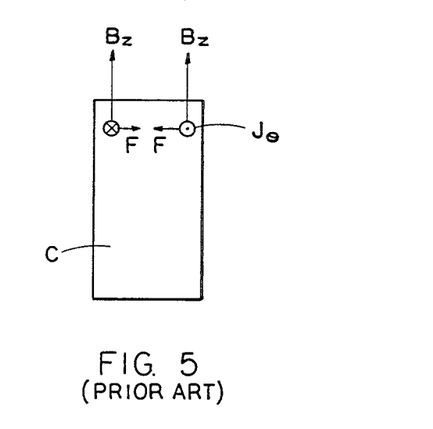
FIG. 5 is a schematical representation of the column of liquid metal flowing through the nozzle and the relative directions of vectors representing the magnetic field, eddy currents and the resulting force on the column.

In FIGS. 4 and 5, the electromagnetic field quantities which govern its operation are indicated. The electromagnetic force density is given by (MKS units)

$$\vec{F} = \vec{J} \times \vec{B} \qquad (1)$$

Inside the valve 30, the magnetic field $\vec{B}$ is predominantly axially directed and the eddy currents $\vec{J}$ are azimuthally directed. (The eddy currents are represented by each of the respective pairs of circles with "." and "x" in them.) Therefore, by equation (1), which expresses the right hand rule, $\vec{F}$ is directed radially inward. This results in an effective pressure which squeezes on the liquid metal column C flowing through the nozzle 32. In the high frequency limit, this magnetic pressure, $P_m$, is given by (MKS units)

$$P_m = B_o^2 / 4u_o \qquad (2)$$

where $B_o$ is the peak amplitude of the (sinusoidally varying) magnetic field inside the coil 34 at the liquid metal surface and $\mu_o$ is the permeability of vacuum (liquid metals are non-ferromagnetic). At lower frequencies, this magnetic pressure is generally less than the equation (2) value.

An approximate analysis can be made of the valve operation, using Bernoulli's equation $$P_m + \rho g z + \tfrac{1}{2}\rho v^2 = \rho g H \qquad (3)$$

where $P_m$ is non-zero primarily inside the valve 30 and where p=liquid metal density, g=acceleration of gravity, v=liquid metal velocity at height z relative to the valve exit, and H=the total liquid metal height measured from the valve exit. Therefore, at the valve exit, z=0, and solving (3) for v, one gets $$v = \sqrt{2gH} \sqrt{1 - P_m/\rho g H} \qquad (4)$$

Without the magnetic pressure $P_m$, the exit velocity, call it $v_o$, would be given by $$v_o = \sqrt{2gH} \qquad (5)$$

Therefore, the velocity ratio is $$v/v_o = \sqrt{1 - P_m/\rho g h} \qquad (6)$$

and this is also the flow ratio, with and without a magnetic field, since the exit area is the same. Thus, the flow can be reduced when the magnetic field is present ($P_m > 0$) according to equation (6).

Upon leaving the magnetic field region below the coil 34, $P_m$ becomes zero and the velocity must increase. Since the flow rate is now fixed at the valve exit value, the liquid column C must constrict. The above-cited patents and publication illustrate and describe the use of a metallic screen in order to achieve a sharp boundary between the magnetic field region and the field free region below the nozzle exit.

However, an electromagnetic flow control valve and a nozzle arrangement as described above can only control liquid metal flow through the nozzle by squeezing or constricting it radially inwardly. Since no net axially-directed force of any significance can be produced by the above-described valve arrangement, the arrangement cannot work as a pump in either upper or downward directions to respectively oppose or assist the liquid metal flow and cannot terminate the flow of metal. Consequently, a need still exists for a different design which will provide a pumping action.

SUMMARY OF THE INVENTION

The present invention provides a liquid metal alternating current electromagnetic flow control device designed to satisfy the aforementioned needs. The device of the present invention, like the prior art control valve, controls the flow of liquid metal through a nozzle by use of an electromagnetic coil. However, unlike the prior art valve, the device of the present invention introduces channels or vanes to obstruct eddy currents in part of the nozzle and thereby shape the magnetic field to produce an axially directed force which opposes the liquid metal flow. Additionally, the liquid metal flow is directed through an annular space in the regions of the nozzle not containing vanes and this enhances the operation of the device. The device works as a pump and its pumping action is adaptable to either oppose or assist liquid flow. In its application as a valve, it opposes the liquid flow.

Accordingly, the present invention is provided in combination with a nozzle constructed of nonconductive material, being connected to a source of liquid metal and defining an orifice for the flow of liquid metal from the source through the orifice. The invention relates to a liquid metal alternating current electromagnetic flow control device for controlling the flow of liquid metal through the nozzle orifice. The flow control device comprises: (a) an electromagnetic coil disposed adjacent to the nozzle and surrounding the orifice therein; and (b) a nonconductive structure disposed along a portion of the coil and occupying an axial portion of the nozzle orifice and leaving an adjacent portion thereof unoccupied. The coil is operable to produce a magnetic field being axially directed and eddy currents being azimuthally directed within the nozzle orifice and the liquid metal flowing therethrough. The nonconductive structure defines eddy current flow regions and eddy current nonflow regions through the occupied portion of the orifice. The eddy current nonflow regions of the structure are designed so as to substantially block production of eddy currents in the liquid metal as it flows through this part of the structure. This results in a reshaping of the magnetic field within the orifice at a region of transition therewithin between the occupied and unoccupied portions of the orifice to have a radially directed component which produces a substantially axially directed pumping force in the nozzle which controls the flow of liquid metal therethrough.

More particularly, the pumping action of the axially directed force of the magnetic field is produced in only one of two opposite axial directions so as to either impede or assist flow of the liquid metal through the orifice. The particular direction in which the axially directed force of the magnetic field is produced depends upon the portion of the coil along which the structure is located and the location of the unoccupied eddy current flow region portion of the orifice in relation to that portion of the coil. More specifically, the nonconductive structure is sized to extend across the nozzle orifice and occupy an axial portion thereof extending along approximately one-half of the extent of the coil from a midpoint to one of the opposite ends of the coil.

The nonconductive structure can take any one of several alternative embodiments. In a first and preferred embodiment, the structure has a central post constituting a central portion of the eddy current nonflow regions of the structure and a plurality of circumferentially spaced apart vanes extending radially from the post and constituting a plurality of peripheral portions of the structure in the eddy current nonflow region. The liquid metal flows through the unoccupied spaces in the orifice located peripherally about the central post and between the spaced apart vanes.

In an alternative, second embodiment, the eddy current nonflow region can be fashioned as described above but the eddy current flow region contains no central post so that a cylindrical flow channel exists for the liquid metal in this region. The eddy current nonflow region may be constructed simply of crossed vanes without a central post or of a cylindrical plug through which holes are bored to allow the liquid metal to flow through.

In another alternative, third embodiment, the structure includes an annular ring sized to extend about the periphery of the axial portion of the nozzle orifice. The ring has a plurality of circumferentially spaced apart ribs connected to and extending radially inward therefrom so as to define a multi-petal shaped space through the structure. The annular ring and the ribs constitute the eddy current nonflow regions of the structure, whereas the multi-petal shaped space through the structure constitutes the eddy current flow regions.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 6–9, there is shown a first and preferred embodiment of a liquid metal electromagnetic flow control device, being generally designated by the numeral 40, constructed in accordance with the present invention. The electromagnetic flow control device 40 is associated with a nozzle 42 which can be part of or protrude from the bottom of a liquid metal-bearing tundish or any other source of liquid metal. The nozzle 42 is made of electrically nonconductive material and defines a cylindrical orifice 44 for the outflow of liquid metal from the tundish. The electromagnetic flow control device 40 is operable to control the flow of liquid metal through the nozzle orifice 44 by imposition of an electromagnetic pumping action thereon.

Figure 6:
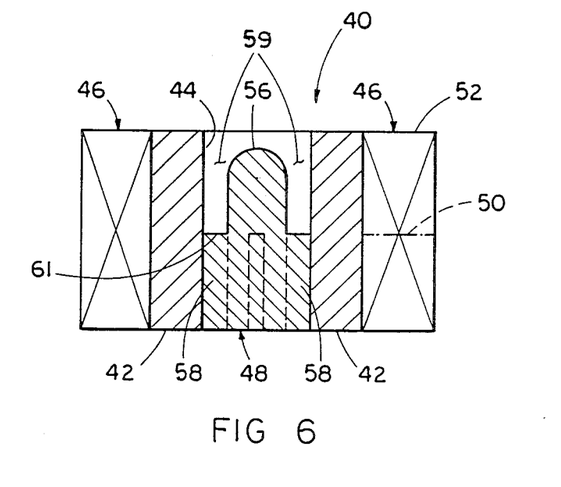
FIG. 6 is an axial sectional view of the electromagnetic flow control device of the present invention taken along line 6—6 of FIG. 7, showing a first embodiment of a nonconductive structure which functions as means for partially blocking eddy currents in the column of liquid metal flowing through the nozzle.
Figure 7:
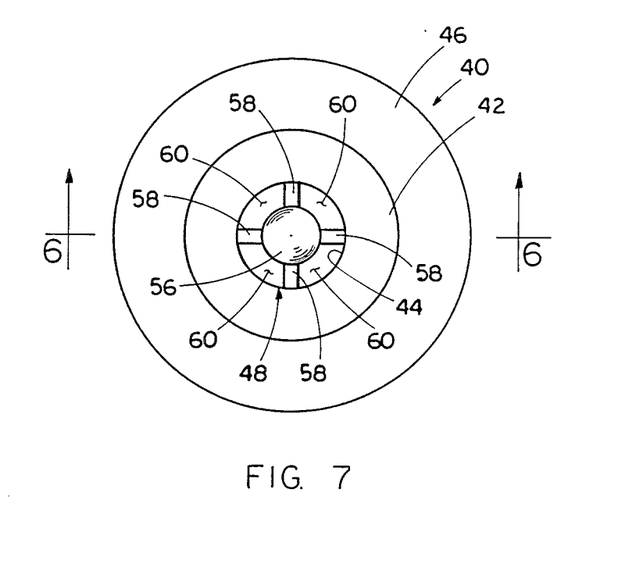
FIG. 7 is a top plan view of the electromagnetic flow control device of FIG. 6.
Figure 8:
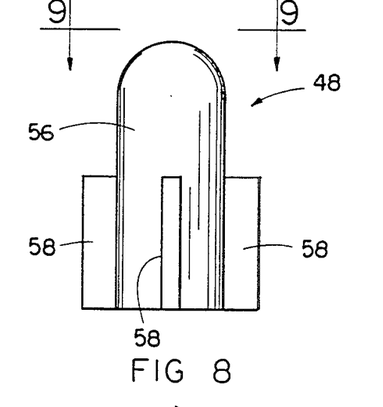
FIG. 8 is an enlarged side elevational view of the first embodiment of the eddy current blocking nonconductive structure of FIG. 6.
Figure 9:
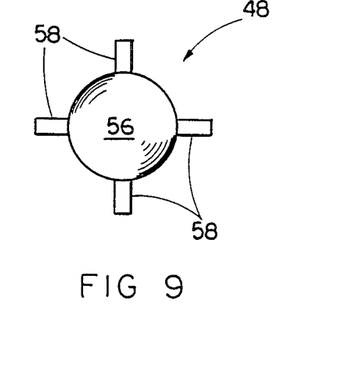
FIG. 9 is a top plan view of the first embodiment of the nonconductive structure as seen along line 9—9 of FIG. 8.

In its basic components, the flow control device 40 includes a high frequency AC electromagnetic coil 46 disposed adjacent the nozzle 42 and surrounding the orifice 44 in a radially outward spaced relation, and an eddy current blocking nonconductive structure 48 disposed within the nozzle orifice 44. In absence of the structure 48, the coil 46 is operable to produce a magnetic field $\vec{B}$ being axially directed and eddy currents $\vec{J}$ being azimuthally directed within the orifice 44 of the nozzle 42 and the liquid metal C flowing therethrough. The nonconductive structure 48 is sized to extend across the nozzle orifice 44 and occupy an axial portion thereof extending along approximately one-half of the extent of the coil 46 from its midpoint 50 to the lower one of its opposite upper and lower ends 52, 54.

More particularly, in the preferred and first embodiment shown in FIGS. 6–9 and 14, the structure 48 includes a central cylindrical post 56 and a plurality of circumferentially spaced apart vanes 58 extending radially outward from the post 56. It will be noted that the post 56 extends above the vanes 58 almost to the level of the upper end 52 of the coil 46. An upper annular portion 59 of the orifice 44 is left unoccupied by the structure 48. Alternatively, the top of the post 56 could be cut off even with the top of the vanes 58. In that case, the upper one-half of the orifice 44 would not be occupied by the structure 48. The post 56 and vanes 58 fill central and peripheral portions of the lower one-half of the orifice 44 and thereby constitute eddy current nonflow regions therein defined by the structure 48. On the other hand, the unoccupied spaces 60 in the orifice 44 located peripherally about the central post 56 and alternately between the vanes constitute metal flow regions defined by the structure 48.

As depicted in FIGS. 6, 7, 14 and 15, the nonflow regions in the orifice 44 defined by the post 56 and vanes 58 of the structure 48 are positioned side-by-side and in alternate relation to the metal flow regions or unoccupied spaces 60 thereof so as to substantially block production of eddy currents produced by the magnetic field in the liquid metal as it flows between the vanes 58. However, none of the structure 48 is positioned to block production of eddy currents J in the unoccupied annular portion 59 of the orifice 44 above the vanes 58. The magnetic field will thus penetrate the occupied or lower portion of the orifice 44 almost as if it were air but will be expelled to some extent from the unoccupied or upper portion of the orifice 44 because of the presence of eddy currents.

Figure 15:
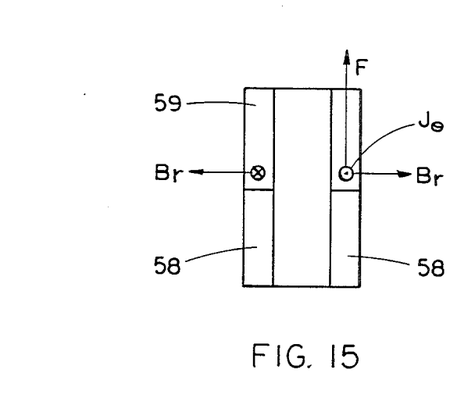
FIG. 15 is a schematic representation of the column of liquid metal flowing through the nozzle which also contains the first embodiment of the eddy current blocking nonconductive structure, showing the relative directions of the vectors representing the magnetic field, eddy currents and the resulting force on the column.

Such abrupt change from the presence to absence of eddy currents in the region of transition 61 between these portions of the orifice 44 respectively unoccupied and occupied by the nonconductive structure 48 causes reshaping of the magnetic field $\vec{B}$ within the orifice at such transition region. Specifically, the magnetic field bows outwardly at the transition region 61 before continuing in a generally axial direction which introduces a radially directed component $\vec{B}_r$ and produces a substantially axially directed electromagnetic pumping force $\vec{F}$, as shown in FIG. 15. Because it is here at the region of transition that the eddy currents are largest, the resulting axial force will also be large. Moreover, because of the asymmetry, this axial force will not be cancelled by some equal and opposite force somewhere else.

Figure 14:
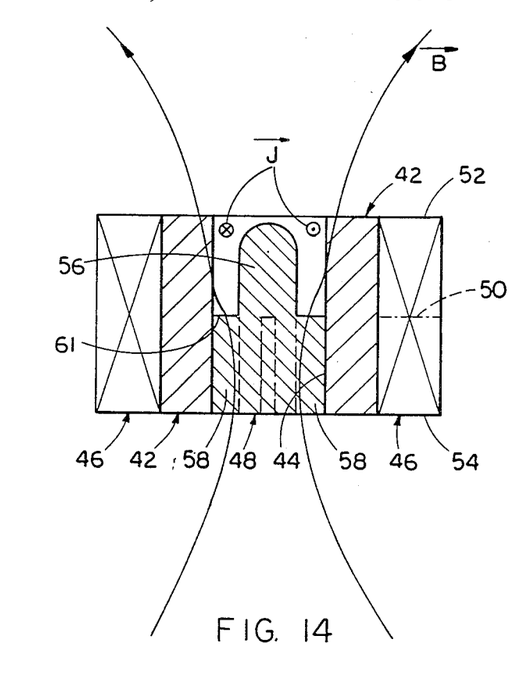
FIG. 14 is an axial sectional view similar to that of FIG. 6, but now showing the direction of the magnetic field and the absence of eddy currents as a result of the presence of the first embodiment of the eddy current blocking nonconductive structure within the nozzle.

Depending upon whether the structure 48 is disposed in the upper portion of the orifice 44 adjacent the upper one-half of the coil 46 or in the lower portion of the orifice 44 adjacent the lower one-half of the coil 46 as seen in FIGS. 6, 14 and 15, the net pumping force F will be correspondingly directed in a downward direction to assist flow or in an upward direction to impede flow. In the former case, the device 40 acts as a pump, whereas in the latter case it acts as a valve. Since the net pumping force points in one or the other but not both, depending on the axial position of the structure 48, the pumping action will either impede or assist the flow. Parenthetically, it should be pointed out here that the magnetic field near the ends of the coil 34 in the prior art valve 30 of FIG. 4 has some slight radial component. This results in a weak force because the eddy currents are reduced in magnitude towards the ends of the coil 34 compared to their value near the center. However, the axial force produced at the top of the valve 30 is equal and opposite to that produced at the bottom thereof which results in no net axial force produced in the prior art valve.

Figure 10:
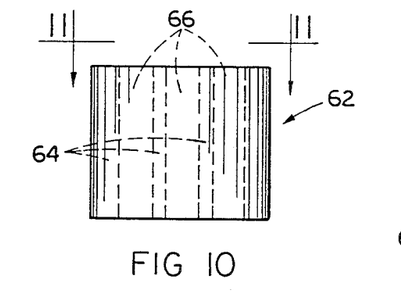
FIG. 10 is a side elevational view of an alternative second embodiment of an eddy current blocking nonconductive structure which can be employed in the electromagnetic flow control device of the present invention.
Figure 11:
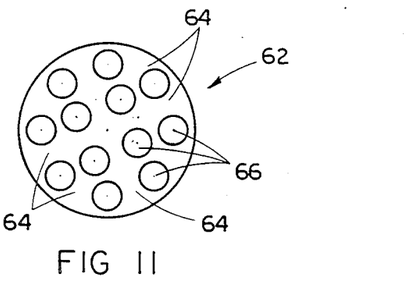
FIG. 11 is a top plan view of the second embodiment of the nonconductive structure as seen along line 11—11 of FIG. 10.

In FIGS. 10 and 11, there is shown an alternative or second embodiment of an eddy current blocking nonconductive structure 62 which can be used in the flow control device 40 of the present invention in place of the first structure 48 even though the latter is the more efficient version of the two. The structure 62 is in the form of a cylindrical plug sized to fill the lower (or upper) axial portion of the nozzle orifice 44. The structure 62 has portions 64 defining a plurality of transversely spaced apart bores 66 extending axially through the structure. The bores 66 in the structure 62 constitute the liquid metal flow regions thereof, whereas the portions 64 defining the bores 66 constitute the liquid metal nonflow regions thereof.

Figure 12:
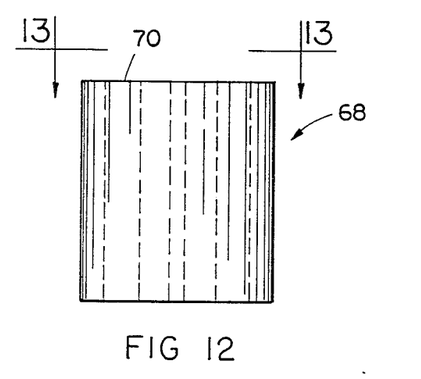
FIG. 12 is a side elevational view of an alternative third embodiment of an eddy current blocking nonconductive structure which can be employed in the electromagnetic flow control device of the present invention.
Figure 13:
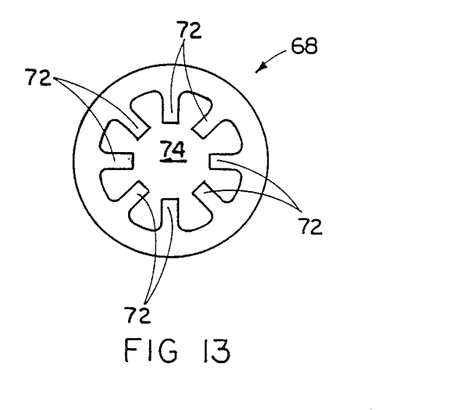
FIG. 13 is a top plan view of the third embodiment of the nonconductive structure as seen along line 13—13 of FIG. 12.

In FIGS. 12 and 13, there is shown another alternative or third embodiment of an eddy current blocking nonconductive structure 68 which can be used in the flow control device 40 of the present invention. The third structure 68 includes an annular ring 70 sized to extend about the periphery of the axial portion of the nozzle orifice 44. The ring 70 has a plurality of circumferentially spaced apart ribs 72 connected to and extending radially inward therefrom so as to define a multi-petal shaped space 74 through the structure 68. The annular ring 70 and the ribs 72 constitute the liquid metal nonflow regions of the structure 68, whereas the multi-petal shaped space 74 constitutes the flow regions thereof.

The alternative eddy current blocking nonconductive structures 48, 62 and 68 can all be made of the same material as the nozzle 42 and indeed could be fabricated as a unit either by machining from a single solid block of material or by casting from a common mold. The material can be ceramic or plastic. They could also be made separately of the same or dissimilar materials and assembled, depending on the application.

It should also be mentioned that in the first structure 48 the flow is substantially annular in cross-sectional shape, whereas in the second and third structures 62 and 68, the flow is substantially solid in cross-section. Also, when using the structure of the device 40 in order to have the same through-flow as in the prior art, the orifice would be made of larger diameter than before.

Numerical Calculations

Numerical calculations for the flow control device 40 presented herein were performed using an electromagnetic finite element code WEMAP which is described in a publication entitled "WEMAP: A General Purpose System for Electromagnetic Analysis and Design: by M. L. Barton et al, IEEE Trans. on Magnetics, Vol. MAG-19 (1983).

Figure 16:
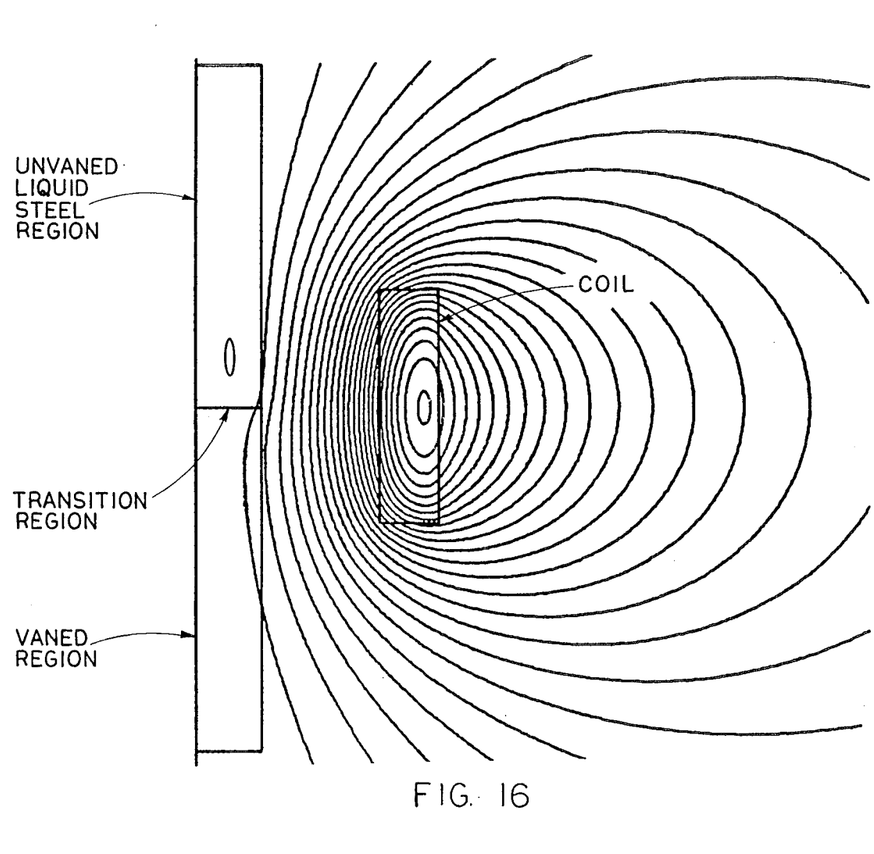
FIG. 16 is a diagram of the flux lines which would be generated by an electromagnetic flow control device having vanes similar to the first embodiment of FIGS. 6–9 but without the central cylindrical post of the eddy current blocking structure being present, this being the second embodiment.

FIG. 16 is a plot of the flux lines which would be generated by an electromagnetic flow control device having vanes similar to the first embodiment of the device, FIGS. 6–9. The flux plot was generated by WEMAP for a total coil current of 10,000 amp-turns at 20 kHz using the following properties of liquid steel: conductivity $\sigma = 0.71 \times 10^6$ $(\Omega - m)^{-1}$; and relative permeability $\mu_r = 1.0$ Note the pronounced radial direction of the magnetic field at the dividing line between the liquid steel vaned and unvaned regions.

Figure 17:
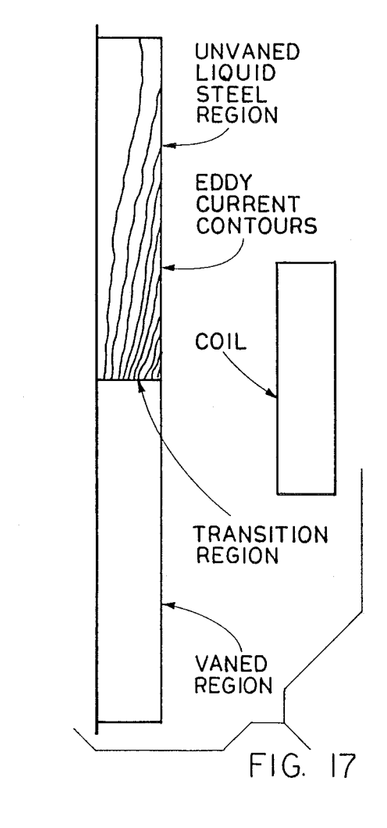
FIG. 17 is a diagram of the eddy current contour lines for the example of FIG. 16.

FIG. 17 is a plot of the eddy current contour lines for the example of FIG. 16. Note how strongly they are concentrated at the vaned-unvaned transition region dividing line where the radial field component is also large.

Figure 18:
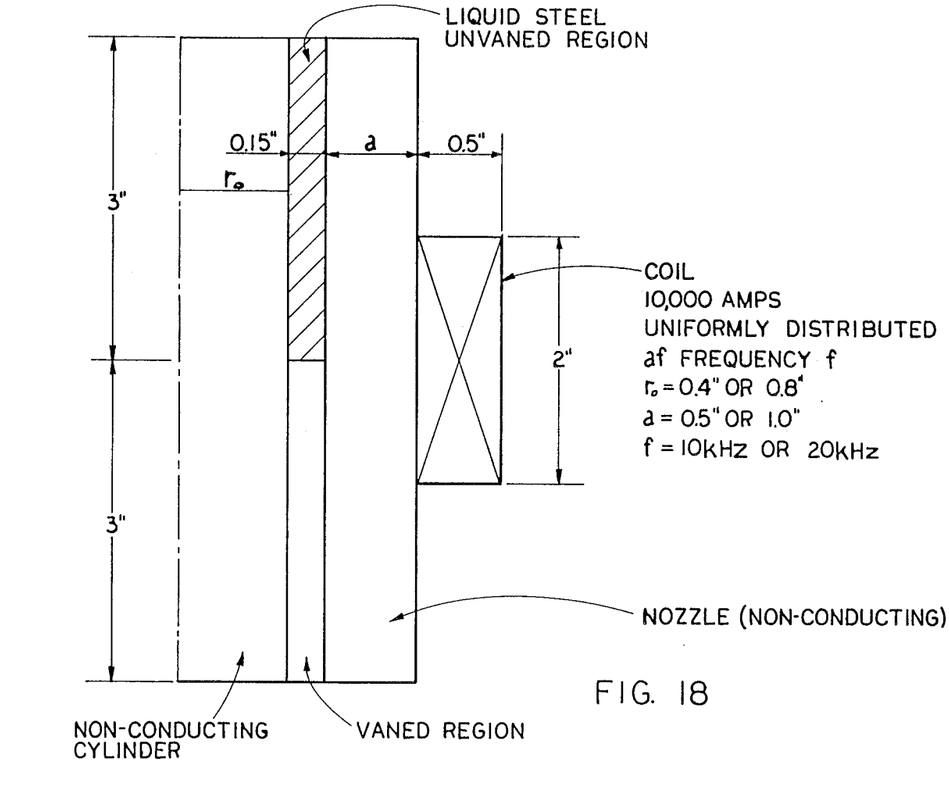
FIG. 18 is a diagram of the dimensions of an electromagnetic flow control device and liquid metal column similar to the one which generated the flux lines and eddy current contour lines of FIGS. 16 and 17, the dimensions being used for numerical calculations made in a study whose results are summarized in Table I.

FIG. 18 is a diagram of the dimensions of an electromagnetic flow control device and liquid metal column similar to the one which generated the flux lines and eddy current contour lines of FIGS. 16 and 17, the dimensions being used for numerical calculations made in a study whose results are summarized in Table I.

TABLE I

| WEMAP Results for the Geometry of FIG. 18 ($I_{coil}$ = 10 kA) | | | | | | | | |
|---|---|---|---|---|---|---|---|---|
| | Case #1 | Case #2 | Case #3 | Case #4 | Case #5 | Case #6 | Case #7 | Case #8 |
| $r_o$(in) | 0.4 | 0.4 | 0.4 | 0.4 | 0.4 | 0.8 | 0.8 | 0.8 |
| a (in) | 1.0 | 1.0 | 0.5 | 1.0 | 1.0 | 1.0 | 0.5 | 0.5 |
| f (kHz) | 10 | 10 | 10 | 20 | 20 | 20 | 20 | 20 |
| Vanes | No | Yes | Yes | Yes | Yes | Yes | Yes | No |
| *Ax Press | 0.063 | 0.876 | 1.42 | 2.2 | 1.35 | 2.18 | 3.52 | 0.093 |
| Loss (kW) | 12.9 | 7.5 | 10.2 | 18.4 | 13.2 | 29.4 | 41.7 | 48.7 |
| kW/psi | 205 | 8.6 | 7.2 | 8.4 | 9.8 | 13.5 | 11.8 | 524 |

*Axial pressure (psi) liquid steel

In the table, Cases 1 and 8 refer to a nozzle orifice without vanes in the bottom annular region thereof. Note how much smaller the axial pressures are as compared with the vaned cases. The axial pressures for Cases 1 and 8 were calculated for the top half of the annular column only since the net pressure for the top and bottom halves is zero. The axial pressures are defined as the net axial force divided by the liquid steel cross-sectional area. This is really a pumping pressure. The liquid steel loss is produced by eddy currents. The quantity kW/psi is a measure of the valve efficiency.

Also in the table, the effect of frequency can be seen by comparing Cases 2 and 5 and Cases 3 and 4 where the frequency doubles for a fixed geometry. The axial pressure increases by about a factor of 1.5. By comparing Cases 2 and 3, Cases 4 and 5, and Cases 6 and 7, it can be seen that the axial pressure increases by about a factor of 1.6 when the annular thickness separating the liquid steel from the coil is cut in half. Thus, this table indicates how parameter changes affect the pumping action as measured by the axial pressure.

Although all the numbers in Table I refer to a coil carrying 10,000 amp-turns, by varying this number the axial forces and pressures will vary and in this manner, flow control can be achieved. The forces will vary with the square of the current in the coil. Another method of varying the flow would be by changing the frequency. When operating the device as a pump, current or frequency control can be used to set the pumping level.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In combination with a nozzle constructed of nonconductive material, being connected to a source of liquid metal and defining an orifice for the flow of liquid metal from said source through said orifice, a liquid metal electromagnetic flow control device for controlling the flow of liquid metal through said nozzle orifice, said device comprising:
   (a) an alternating current electromagnetic coil disposed adjacent said nozzle and surrounding said orifice therein, said coil being operable to produce a magnetic field being axially directed and eddy currents being azimuthally directed within said orifice of said nozzle and the liquid metal flowing therethrough; and
   (b) a nonconductive structure disposed along a portion of said coil and occupying an axial portion of said nozzle orifice and leaving an adjacent portion of said nozzle orifice unoccupied by said structure, said structure defining axially extending flow regions and axially extending nonflow regions through said occupied portion of said orifice, said nonflow regions of said structure being positioned axially adjacent to said flow regions thereof so as to substantially block production of eddy currents in the liquid metal as it flows through said axially extending flow regions of said structure and thereby reshape the magnetic field within said orifice at a region of transition therewithin between said occupied and unoccupied portions of said orifice to have a radially directed component which produces a substantially axially directed pumping force in said nozzle which controls the flow of liquid metal therethrough.

2. The device as recited in claim 1, wherein said coil is disposed adjacent said nozzle and surrounding but displaced radially outward from said orifice.

3. The device as recited in claim 1, wherein:
   said coil has opposite ends and a midpoint located therebetween; and
   said nonconductive structure is sized to extend across said orifice of said nozzle and occupy an axial portion thereof extending along approximately one-half of the extent of said coil from said midpoint to one of said opposite end thereof.

4. The device as recited in claim 1, wherein said structure includes a central post constituting a central portion of said nonflow regions of said structure and a plurality of circumferentially spaced apart vanes extending radially from said post and constituting a plurality of peripheral portions of said nonflow regions of said structure which alternate with said flow regions of said structure being constituted by unoccupied spaces in said orifice located peripherally about said central post and between said spaced apart vanes.

5. The device as recited in claim 1, wherein said structure includes a cylindrical plug sized to fill said axial portion of said nozzle orifice and having portions defining a plurality of transversely spaced apart bores extending axially through said plug, said bores in said plug constituting said flow regions of said structure and said portions of said plug defining said bores constituting said nonflow regions of said structure.

6. The device as recited in claim 1, wherein said structure includes an annular ring sized to extend about the periphery of said axial portion of said nozzle orifice and having a plurality of circumferentially spaced apart ribs connected to and extending radially inward from said annular ring so as to define a multi-petal shaped space through said structure, said annular ring and said ribs constituting said nonflow regions of said structure and said multi-petal shaped space defined thereby constituting said flow regions of said structure.

7. In combination with a nozzle constructed of nonconductive material, being connected to a source of liquid metal and defining an orifice for the flow of liquid metal from said source through said orifice, a liquid metal electromagnetic flow control device for controlling the flow of liquid metal through said nozzle orifice, said device comprising:
   (a) an alternating current electromagnetic coil disposed adjacent said nozzle and surrounding but displaced radially outward from said orifice, said coil being operable to produce a magnetic field being axially directed and eddy currents being azimuthally directed within said orifice of said nozzle and the liquid metal flowing therethrough, said coil having opposite ends and a midpoint located therebetween; and
   (b) a nonconductive structure sized to extend across said orifice of said nozzle and occupy an axial portion thereof extending along approximately one-half of the extent of said coil from said midpoint to one of said opposite ends thereof, said structure defining axially extending flow regions and axially extending nonflow regions through said portion of said orifice occupied by said structure, said nonflow regions of said structure being positioned axially adjacent to said flow regions thereof and said axially directed magnetic field produced by said coil so as to substantially block production of eddy currents in the liquid metal as it flows through said axially extending flow regions of said structure and thereby reshape the magnetic field within said orifice at a region of transition therewithin between said portion of said orifice occupied by said structure and a portion of said orifice unoccupied by said structure to have a radially directed component which produces a substantially axially directed pumping force in only one of two opposite axial directions so as to either impede or assist flow of liquid metal through said orifice depending upon which one of said halves of said coil said structure extends along and the location of said unoccupied portion of said orifice in relation to said one of said coil halves.

8. The device as recited in claim 7, wherein said structure includes a central post constituting a central portion of said nonflow regions of said structure and a plurality of circumferentially spaced a part vanes extending radially from said post and constituting a plurality of peripheral portions of said nonflow regions of said structure which alternate with said flow regions of said structure being constituted by unoccupied spaces in said orifice located peripherally about said central post and between said spaced apart vanes.

9. The device as recited in claim 7, wherein said structure includes a cylindrical plug sized to fill said axial portion of said nozzle orifice and having portions defining a plurality of transversely spaced apart bores extending axially through said plug, said bores in said plug constituting said flow regions of said structure and said portions of said plug defining said bores constituting said nonflow regions of said structure.

10. The device as recited in claim 7, wherein said structure includes an annular ring sized to extend about the periphery of said axial portion of said nozzle orifice and having a plurality of circumferentially spaced apart ribs connected to and extending radially inward from said annular ring so as to define a multi-petal shaped space through said structure, said annular ring and said ribs constituting said nonflow regions of said structure and multi-petal shaped space defined thereby constituting said flow regions of said structure.

11. An electromagnetic flow control device for controlling a flow of liquid metal, comprising:
(a) an alternating current electromagnetic coil defining an axially extending central space for flow of liquid metal therethrough, said coil being operable to produce a magnetic field being axially directed through said central space and said liquid metal flow and to produce eddy currents being azimuthally directed within the flow of liquid metal; and
(b) a nonconductive structure adapted to be disposed within said coil and along a portion thereof so as to occupy an axial portion of said space through aid coil and leave an adjacent portion of said space unoccupied by said structure, said structure defining axially extending flow regions and axially extending nonflow regions through said structure and said occupied portion of said space, said axially extending nonflow regions of said structure being positioned axially adjacent to said flow regions thereof so as to substantially block production of eddy currents in the liquid metal as it flows through said flow regions of said structure and thereby reshape the magnetic field within said space at a region of transition therewithin between said axially extending occupied and unoccupied portions of said space to have a radially directed component which produces a substantially axially directed pumping force in said space which controls the flow of liquid metal therethrough.

12. The device as recited in claim 11, wherein;
said coil has opposite ends and a midpoint located therebetween; and
said nonconductive structure is sized to extend across said space and occupy an axial portion thereof extending along approximately one-half of the extent of said coil from said midpoint to one of said opposite ends thereof.

13. The device as recited in claim 11, wherein said structure includes a central post constituting a central portion of said non-flow of said structure and a plurality of circumferentially spaced apart vanes extending radially from said post and constitution a plurality of peripheral portions of said nonflow regions of said structure which alternate with said flow regions of said structure being constituted by unoccupied portions of said coil space located peripherally about said central post and between said spaced apart vanes.

14. The device as recited in claim 11, wherein said structure includes a cylindrical plug sized to fill said axial portion of said coil space and having portions defining a plurality of transversely spaced apart bores extending axially through said plug, said bores in said plug constituting said flow regions of said structure and said portions of said plug defining said bores constituting said nonflow regions of said structure.

15. The device as recited in claim 11, wherein said structure includes an annular ring sized to extend about the periphery of said axial portion of said coil space and having a plurality of circumferentialy spaced apart ribs connected to and extending radially inward from said annular ring so as to define a multi-petal shaped space through said structure, said annular ring and said ribs constituting said nonflow regions of said structure and said multi-petal shaped space defined thereby constituting said flow regions of said structure.

* * * * *